(12) United States Patent
Kim et al.

(10) Patent No.: US 9,491,754 B2
(45) Date of Patent: Nov. 8, 2016

(54) METHOD AND APPARATUS FOR TRANSMITTING/RECEIVING UE REFERENCE SIGNAL WITH SELECTIVE MUTING IN WIRELESS COMMUNICATION SYSTEM

(71) Applicant: Samsung Electronics Co., Ltd., Suwon-si, Gyeonggi-do (KR)

(72) Inventors: Han-Ju Kim, Seoul (KR); Chae-Man Lim, Seoul (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 13/923,728

(22) Filed: Jun. 21, 2013

(65) Prior Publication Data
US 2013/0343302 A1    Dec. 26, 2013

(30) Foreign Application Priority Data
Jun. 22, 2012   (KR) .................. 10-2012-0067675

(51) Int. Cl.
| | | |
|---|---|---|
| H04B 7/00 | (2006.01) | |
| H04W 72/04 | (2009.01) | |
| H04L 5/00 | (2006.01) | |
| H04J 11/00 | (2006.01) | |
| H04L 25/02 | (2006.01) | |

(52) U.S. Cl.
CPC ...... *H04W 72/0426* (2013.01); *H04J 11/0056* (2013.01); *H04L 5/0051* (2013.01); *H04L 5/0053* (2013.01); *H04L 5/0073* (2013.01); *H04L 25/0204* (2013.01)

(58) Field of Classification Search
CPC ............. H04W 52/325; H04W 72/08; H04W 72/082; H04W 72/1231; H04B 7/0417; H04L 25/03955; H04L 27/2646; H04L 25/0204; H04L 5/0048
USPC .......... 455/509, 13.4, 522, 574, 403, 412.2, 455/436, 455, 456.5, 41.1, 41.2; 370/208, 370/329, 331, 336
See application file for complete search history.

(56) References Cited

U.S. PATENT DOCUMENTS

| | | |
|---|---|---|
| 2004/0131029 A1* | 7/2004 | Tobe et al. .................. 370/331 |
| 2006/0072535 A1 | 4/2006 | Ito |
| 2007/0010251 A1 | 1/2007 | Cho et al. |

(Continued)

FOREIGN PATENT DOCUMENTS

| | | |
|---|---|---|
| WO | 2012-036492 A2 | 3/2012 |
| WO | 2013/183823 A1 | 12/2013 |

OTHER PUBLICATIONS

Intel Corporation (UK) LTD; Signalling and power utilization considerations for PDSCH muting; 3GPP TSG RAN WG1 Meeting #62; R1-104376; XP050449727; Aug. 23-27, 2010; Madrid, Spain.
3GPP; 3rd Generation Partnership Project; Technical Specification Group Radio Access Network; Coordinated multi-point operation for LTE physical layer aspects (Release 11); 3GPP TR 36.819; V11.1.0; XP050555015; Dec. 15, 2011; France.
Nam et al.; Evolution of Reference Signals for LTE-Advanced Systems; LTE-Advanced and 4G Wireless Communications; IEEE Communications Magazine; XP011417049; Feb. 1, 2012.

(Continued)

*Primary Examiner* — Shaima Q Aminzay
(74) *Attorney, Agent, or Firm* — Jefferson IP Law, LLP

(57) ABSTRACT

In a wireless communication system, a first Base Station (BS) receives control information including information related to transmission of a Reference Signal (RS) of at least one second BS from the at least one second BS which corresponds to an adjacent BS of the first BS, and transmits the RS by using a preset scheme of controlling interference based on the received control information.

20 Claims, 14 Drawing Sheets

(56) References Cited

U.S. PATENT DOCUMENTS

| | | |
|---|---|---|
| 2010/0309876 A1 | 12/2010 | Khandekar et al. |
| 2011/0143806 A1 | 6/2011 | Song et al. |
| 2011/0230144 A1 | 9/2011 | Siomina et al. |
| 2011/0267937 A1 | 11/2011 | Yoo et al. |
| 2012/0033571 A1* | 2/2012 | Shimezawa et al. ......... 370/252 |
| 2012/0040701 A1 | 2/2012 | Tong et al. |
| 2012/0057519 A1 | 3/2012 | Kim et al. |
| 2013/0172003 A1 | 7/2013 | Chun et al. |

OTHER PUBLICATIONS

Marvell; DM-RS design considerations for CoMP; 3GPP TSG-RAN WG1 #68; R1-120391; XP050563314; Feb. 6-10, 2012; Dresden, Germany.

Huawei; Discussion on MU-MIMO in LTE-A; 3GPP TSG RAN WG1 #58bis; R1-093842; Oct. 12-16, 2009; Miyazaki, Japan.

* cited by examiner

METHOD AND APPARATUS FOR TRANSMITTING/RECEIVING UE REFERENCE SIGNAL WITH SELECTIVE MUTING IN WIRELESS COMMUNICATION SYSTEM

PRIORITY

This application claims the benefit under 35 U.S.C. §119 (a) of a Korean patent application filed on Jun. 22, 2012 in the Korean Intellectual Property Office and assigned Serial No. 10-2012-0067675, the entire disclosure of which is hereby incorporated by reference.

BACKGROUND OF THE INVENTION

1. Field of the Invention

The present invention relates to a method and an apparatus for transmitting/receiving a signal in a wireless communication system. More particularly, the present invention relates to a method and apparatus for transmitting/receiving a Reference Signal (RS) which does not generate inter-cell interference in a wireless communication system.

2. Description of the Related Art

In a next generation wireless communication system, a cell radius becomes very small in comparison with a cellular environment according to the related art. Further, in a next generation wireless communication system, cells are non-uniformly distributed as a result of operations (e.g., the existence or deployment) of various cells such as a femto cell, and the like. Under such an environment, inter-cell interference is the largest cause of deterioration of a capability of a User Equipment (UE) according to a packet error.

In order to solve an interference problem in the wireless communication system, an interference signal and channel information on the interference signal should be accurately estimated. To this end, a Reference Signal (RS) may be transmitted on an Orthogonal Frequency Division Multiplex (OFDM) domain in the wireless communication system (e.g., Long Term Evolution (LTE)).

As an example, the RS may include a UE-specific Reference Signal (URS). The URS refers to an RS used in a transmission mode using beamforming In general, the URS is transmitted to improve a capability of each UE and is transmitted using a Resource Block (RB) to which a data signal is allocated in a corresponding OFDM signal.

The URS of each cell is transmitted using the same resource in the wireless communication system. For example, among a plurality of cells, the URS of a first cell and the URS of a second cell corresponding to an adjacent cell of the first cell are always transmitted using the same resource. Because an inter-cell interference problem according to URS transmission is continuously generated in the wireless communication system, a channel estimation capability of the UE within each cell may deteriorate.

Accordingly, a method of solving the inter-cell interference problem due to the URS transmission should be used in the wireless communication system. However, when the method is used, complexity according to signal transmission/reception increases.

Therefore, a need exists for a method and apparatus of fundamentally solving the inter-cell interference problem. For example, a need exists for a method and apparatus for transmitting/receiving a Reference Signal (RS) which does not generate inter-cell interference in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting/receiving a signal in a wireless communication system.

Another aspect of the present invention is to provide a method and an apparatus for transmitting/receiving a Reference Signal (RS) which does not generate inter-cell interference in a wireless communication system.

Another aspect of the present invention is to provide a method and an apparatus for reducing complexity according to signal transmission/reception in a wireless communication system and improving a channel estimation capability of a User Equipment (UE).

In accordance with an aspect of the present invention, a method of transmitting a signal by a first Base Station (BS) in a wireless communication system is provided. The method includes receiving control information including information related to transmission of a Reference Signal (RS) of at least one second BS from the at least one second BS which corresponds to an adjacent BS of the first BS, and transmitting the RS by using a preset scheme of controlling interference based on the received control information.

In accordance with another aspect of the present invention, a method of receiving a signal by a UE in a wireless communication system is provided. The method includes receiving control information including information related to transmission of RSs of a first BS and at least one second BS which corresponds to an adjacent BS of the first BS, receiving the RS from the first BS based on the control information, and when a signal using a resource corresponding to a resource used by the first BS to transmit the RS is received from the at least one second BS, removing the received signal.

In accordance with another aspect of the present invention, a first BS in a wireless communication system is provided. The first BS includes a receiver that receives control information including information related to transmission of a RS of at least one second BS from the at least one second BS which corresponds to an adjacent BS of the first BS, and a transmitter that transmits the RS by using a preset scheme of controlling interference based on the received control information.

In accordance with another aspect of the present invention, a UE in a wireless communication system is provided. The UE includes a receiver that receives control information including information related to transmission of RSs of a first BS and at least one second BS which corresponds to an adjacent BS of the first BS and receives the RS from the first BS based on the control information, and a controller that, when a signal using a resource corresponding to a resource used by the first BS to transmit the RS is received from the at least one second BS, removes the received signal.

The present invention has an effect of not generating interference due to inter-cell RS transmission by transmitting a RS by using different resources between respective cells.

The present invention has an advantage of improving a channel estimation capability of a UE by transmitting an RS of a first cell and an RS of a second cell corresponding to an adjacent cell of the first cell among a plurality of cells by using different resources in different codes.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1A:
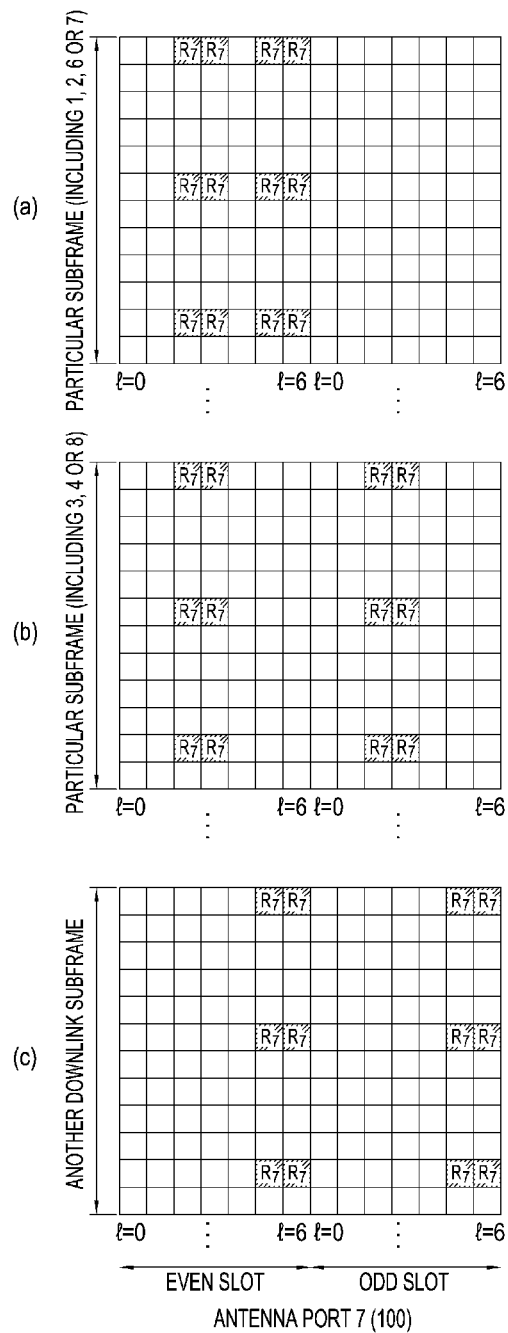
FIGS. 1A to 1D are diagrams illustrating Resource Block (RB) mapping of a User Equipment (UE)-specific Reference Signal (URS) used in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for transmitting/receiving a signal in a wireless communication system. Specifically, exemplary embodiments of the present invention provide a method and an apparatus which allows respective cells to transmit a Reference Signal (RS) by using different codes and resources to prevent an interference problem associated with RS transmission. The following exemplary embodiment of the present invention will describe a case in which the RS is a User Equipment (UE)-specific Reference Signal (URS) as an example.

According to exemplary embodiments of the present invention, the wireless communication system may be a wireless communication system requiring an interference control, such as a Global System for Mobile communications (GSM), Wideband Code Division Multiple Access (WCDMA), a Universal Mobile Telecommunications System (UMTS), and a Long Term Evolution (LTE) system. Hereinafter, a case in which the wireless communication system is an LTE communication system will be described as an example for convenience of the description.

In general, in order to use an interference aware cancellation communication scheme, channel estimation for an interference signal should be performed. The channel estimation for the interference signal may be performed based on a URS of an interference cell or the like. The URS is an RS transmitted to improve a capability of each UE in a transmission mode using beamforming, which may not be transmitted in every symbol but may be transmitted for each transmission antenna.

Hereinafter, the URS will be described with reference to FIGS. 1A to 1D.

FIGS. 1A to 1D are diagrams illustrating examples of Resource Block (RB) mapping of the URS used in a wireless communication system according to an exemplary embodiment of the present invention.

Referring to FIGS. 1A to 1D, examples in which the URS is mapped into the RB corresponding to each of antenna ports #7 100, #8 102, #9 104, and #10 106 are illustrated. Further, "$R_7$", "$R_8$", "$R_9$" and "$R_{10}$" illustrated in FIGS. 1A to 1D indicate URSs allocated to the antenna ports #7 100, #8 102, #9 104, and #10 106, respectively. In addition, FIG. 1A (a), FIG. 1B (a), FIG. 1C (a), and FIG. 1D (a) illustrate examples of RB mapping of the URS in a preset particular subframe (e.g., subframe 1, 2, 6, or 7), FIG. 1A (b), FIG. 1B (b), FIG. 1C (b), and FIG. 1D (b) illustrate examples of RB mapping of the URS in a preset particular subframe (e.g., subframe 3, 4, or 8), and FIG. 1A (c), FIG. 1B (c), FIG. 1C (c), and FIG. 1D (c) illustrate examples of RB mapping of the URS in the remaining frames.

Figure 1B:
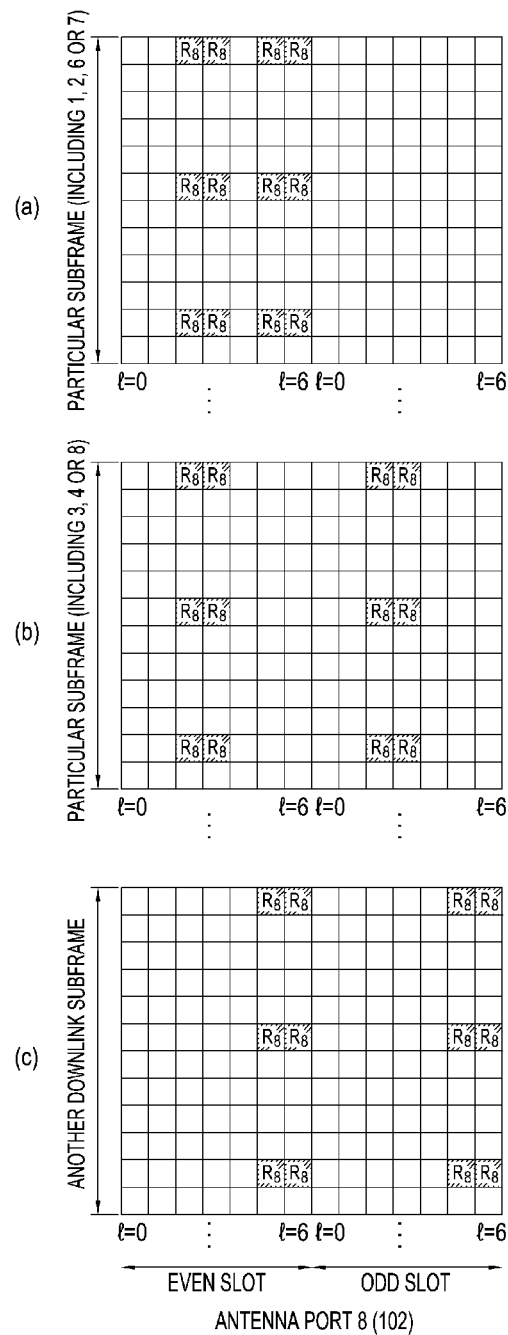
Figure 1C:
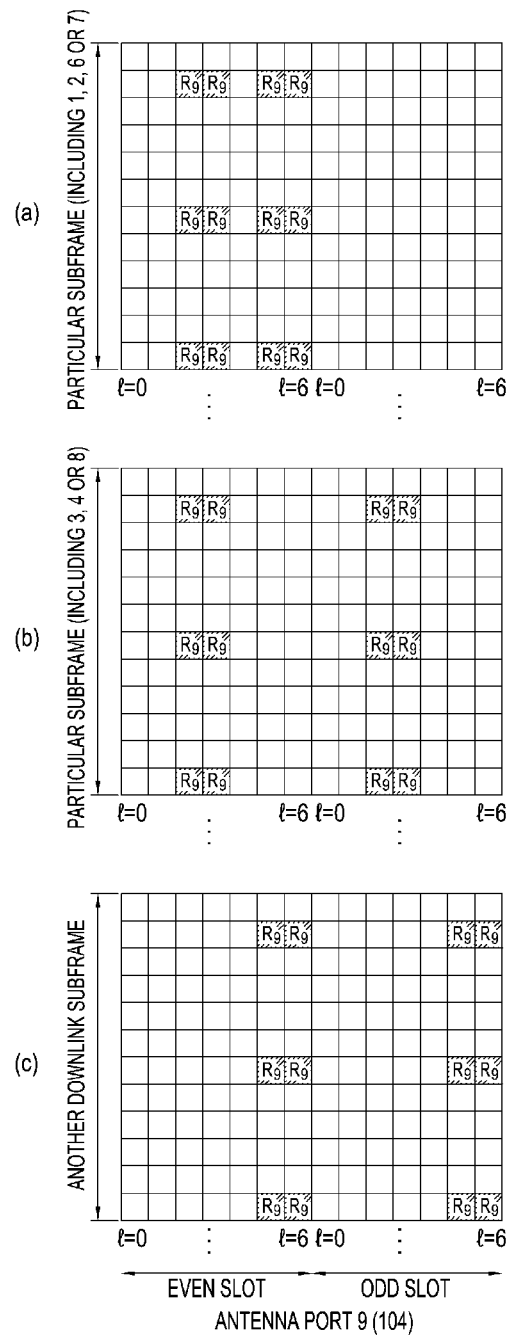
Figure 1D:
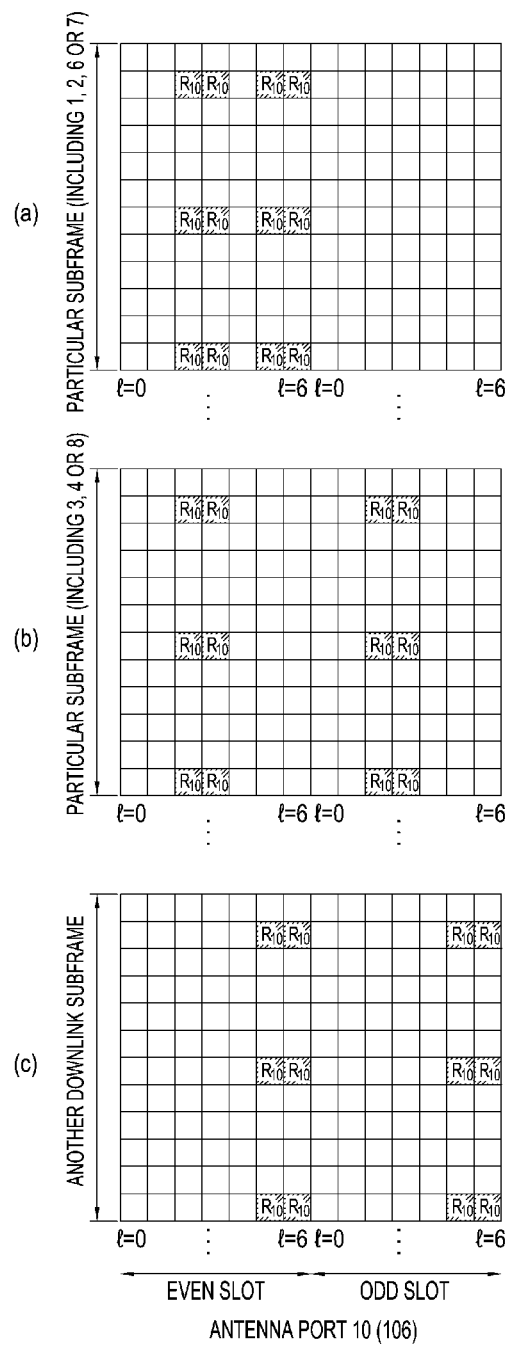

Referring to FIGS. 1A and 1B, the URS allocated to the antenna ports #7 and #8 100 and 102 indicated by "R$_7$" and "R$_8$" is transmitted in each subframe by using the same resource. Further, referring to FIGS. 1C and 1D, the URS allocated to the antenna ports #9 and #10 104 and 106 indicated by "R$_9$" and "R$_{10}$" is transmitted in each subframe by using the same resource.

In order to distinguish between URSs transmitted using the same resource for each antenna, an orthogonal Walsh sequence may be used. When the Walsh sequence is used, the URS can be transmitted as a mutually orthogonal signal according to Code Division Multiplexing (CDM) and Frequency Division Multiplexing (FDM), and the number of URSs can be minimized.

The URS is transmitted using a Resource Element (RE) to which a data signal is allocated. Accordingly, a UE may estimate a channel value transmitted for each sub-carrier (or each RE) in order to decode a signal of a serving cell servicing the UE. An apparatus performing such an operation is generally referred to as a channel estimator. The channel estimator estimates a channel value of the RS by using cell identifier (ID) information and the RS in order to estimate a channel value of a received signal, and estimates channel values of the remaining sub-carriers based on the estimated channel value of the RS. When the channel value for each sub-carrier is estimated by the channel estimator, an operation of detecting and decoding the received signal based on the estimated channel value is performed. Accordingly, a capability of the channel estimator for the signal of the serving cell most significantly influences a capability according to a packet error of a receiver.

Because the URSs are transmitted using the same resource for each cell ID, the URS of the serving cell is always transmitted using the same resource as the resource for the URS of the interference cell. Accordingly, when the URS is transmitted, interference exists, thereby causing problems. As a result, a channel estimation capability cannot help deteriorating.

In order to solve the above problem, exemplary embodiments of the present invention provide a method of transmitting/receiving the URS. Prior to the description thereof, a wireless communication system according to an exemplary embodiment of the present invention will be described with reference to FIG. 2.

Figure 2:
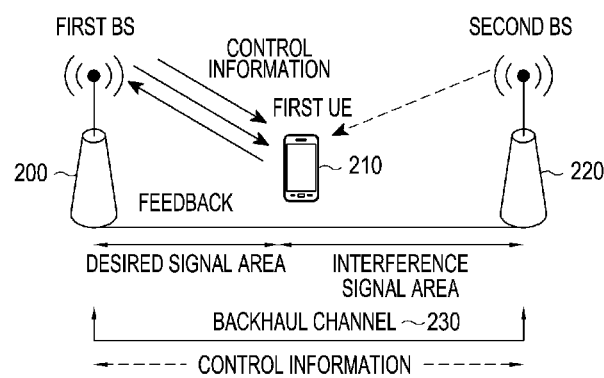
FIG. 2 is a diagram illustrating a wireless communication system according to an exemplary embodiment of the present invention.

FIG. 2 is a diagram illustrating a wireless communication system according to an exemplary embodiment of the present invention.

Referring to FIG. 2, the wireless communication system includes a first BS 200, a first UE 210 receiving a signal from the first BS 200, a second BS 220 adjacent to the first BS 200, and a second UE (not shown) receiving a signal from the second BS 220.

The first BS 200 and the second BS 220 indicate transmitters used in the general wireless communication system. For example, the first BS 200 and the second BS 220 may be evolved Node Bs (eNBs) when the wireless communication system corresponds to an LTE system, and the first BS 200 and the second BS 220 may be Node Bs when the wireless communication system corresponds to a UMTS (e.g., WCDMA) system. Further, when signaling to comply with a communication standard is used, the first BS 200 and the second BS 220 may be base stations having a widespread meaning including an Evolved Packet Core (EPC), a Radio Network Controller (RNC) and the like.

As illustrated in FIG. 2, a backhaul channel 230 simplifies various network configurations which connect BSs in a wireless communication network. According to exemplary embodiments of the present invention, the backhaul channel 230 refers to a transmission channel performing signaling between different BSs and exchanging data, and the like. The first BS 200 and the second BS 220 exchange control information including signal transmission information between each other by using the backhaul channel 230.

For example, the first BS 200 makes a request for transmitting information indicating whether the same resource as the resource used to transmit a current signal is used (or whether there are overlapping resources to acquire a maximum gain by using interference recognition communication) to the second BS 220. Thereafter, the second BS 220 determines whether the same resource is used and then transmits control information including a result thereof to the first BS 200.

The first BS 200 receives the control information and determines whether the second BS 220 corresponds to an interference BS using the same resource as the resource used to transmit the signal to the first UE 210. When the first BS 200 determines that the second BS 220 corresponds to the interference BS, the first BS 200 generates control information (hereinafter, referred to as "interference control information") on an interference signal to be transmitted to the first UE 210 based on the received control information and transmits the generated interference control information to the first UE 210. Thereafter, the first UE 210 recognizes the interference signal based on the interference control information and performs an interference recognition operation of removing the interference signal from the received signal.

Accordingly, each of the first BS 200 and the second BS 220 prevents inter-cell interference and solves a problem in which channel estimation capabilities of the first UE 210 and the second UE deteriorate by transmitting signals with reference to received signal transmission information of adjacent BSs.

Meanwhile, the first BS 200 exchanges the control information with one BS (e.g., the second BS 220) in the example illustrated in FIG. 2, the first BS 200 may exchange the control information with a plurality of adjacent BSs.

The operation of the first BS 200 may be divided into a passive operation and an active operation. The passive operation includes an operation in which the first BS 200 determines whether adjacent cells cause interference (e.g., interference generated by using the same resource or partially overlapping resources with the first BS 200) based on control information received from adjacent BSs, and an operation in which the first BS 200 transmits interference control information according to a result of the determination (e.g., as to whether adjacent cells cause interference) to the first UE 210. In order to perform the passive operation, respective BSs exchange control information by using an independent scheduler.

When the passive operation is performed, the first BS 200 transmits interference control information to the first UE 210 when adjacent cells cause interference and the first BS 200 may not transmit the interference control information when adjacent cells do not cause interference.

The active operation includes an operation of scheduling such that, even though adjacent cells are not determined to cause interference (or significant or noticeable interference), if a large gain according to interference recognition communication is expected, the first BS 200 can use the same resource as the resource of the interference BS through a negotiation with the corresponding interference BS in transmitting the URS. In this case, the first BS 200 determines interference information which is determined to acquire the gain and performs a scheduling operation through which a frequency resource is allocated to a most similar position to the position of the BS transmitting corresponding interference information. When the active operation is performed, an efficiency of the frequency resource can be increased by allowing the UE which can acquire the gain through the interference recognition communication to maximally share the resource.

Meanwhile, the serving BS and the interference BS use the same resource to transmit the URS. In this case, the URS of the serving BS collides with the URS of the interference BS, thereby resulting in a deterioration of a capability of the UE. In order to solve the above problem, exemplary embodiments of the present invention provide a new method of transmitting the URS.

The operations of the first BS 200 and the first UE 210 according to an exemplary embodiment of the present invention will be described below. In the following description, the first BS 200 corresponds to the serving BS and the first UE 210 corresponds to the serving cell UE for convenience of the description.

First, the operation of the serving BS will be described with reference to FIGS. 3 to 6. The operation of the serving BS may be divided into four embodiments as illustrated in FIGS. 3 to 6.

Figure 3:
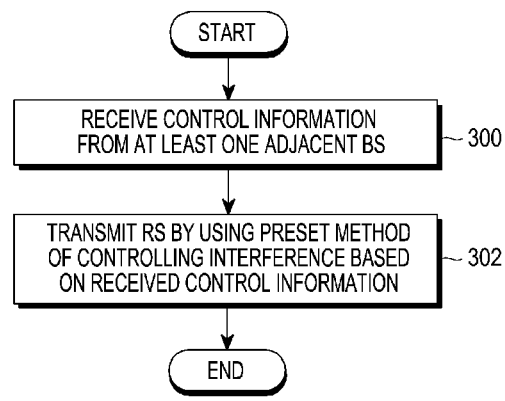
FIG. 3 is a flowchart illustrating a process in which a serving Base Station (BS) transmits a URS according to a first exemplary embodiment of the present invention.

FIG. 3 is a flowchart illustrating a process in which a serving BS transmits a URS according to a first exemplary embodiment of the present invention.

Referring to FIG. 3, in step 300, the serving BS receives control information from at least one adjacent BS. The control information may include scheduling information such as signal transmission information including URS transmission information of the at least one adjacent BS and resource allocation information.

Accordingly, the serving BS can identify (e.g., determine) a resource used to transmit the URS by the at least one adjacent BS based on the received control information. Further, based on the received control information, the serving BS can determine whether the resource used to transmit the URS by the at least one BS corresponds to the same resource used to transmit the URS by the serving BS. In another method, when the serving BS requests information indicating whether the resources are the same as the resources for the at least one adjacent BS, the information indicating whether the resources are the same may be included in the control information.

The control information may be received through various methods such as being received according to a request of the serving BS or periodically. Further, the control information may be transmitted to the serving cell UE periodically, at a particular time, or according to a request of the serving cell UE in order to be used to control interference of the at least one adjacent BS.

The serving BS performs communication with the at least one adjacent BS based on the received control information. When each of the serving BS and the at least one adjacent BS determines that the interference by adjacent cells will be generated in the UE of the corresponding cell, the respective cells determine to use different resources for URS transmission. For example, the serving BS can preset a method for the interference control. Accordingly, in step 302, when the at least one adjacent cell is determined to cause (e.g., generate) the interference, the serving BS transmits the RS by using a preset method (hereinafter, referred to as an "interference control method") of controlling the interference based on the received control information.

Meanwhile, the interference control method may be performed based on, for example, a cell ID, and resources for URS transmission may be different for each cell based on the cell ID. For example, when the interference control method is used, the BS having a larger cell ID (or smaller cell ID) among the serving cell and the at least one adjacent cell may be determined to use a higher or lower frequency band based on sizes of the ID of the serving cell and the ID of the at least one adjacent ID. In another method, the serving BS performs communication with the at least one adjacent BS such that respective cells transmit the URS by using different frequency bands.

Figure 4:
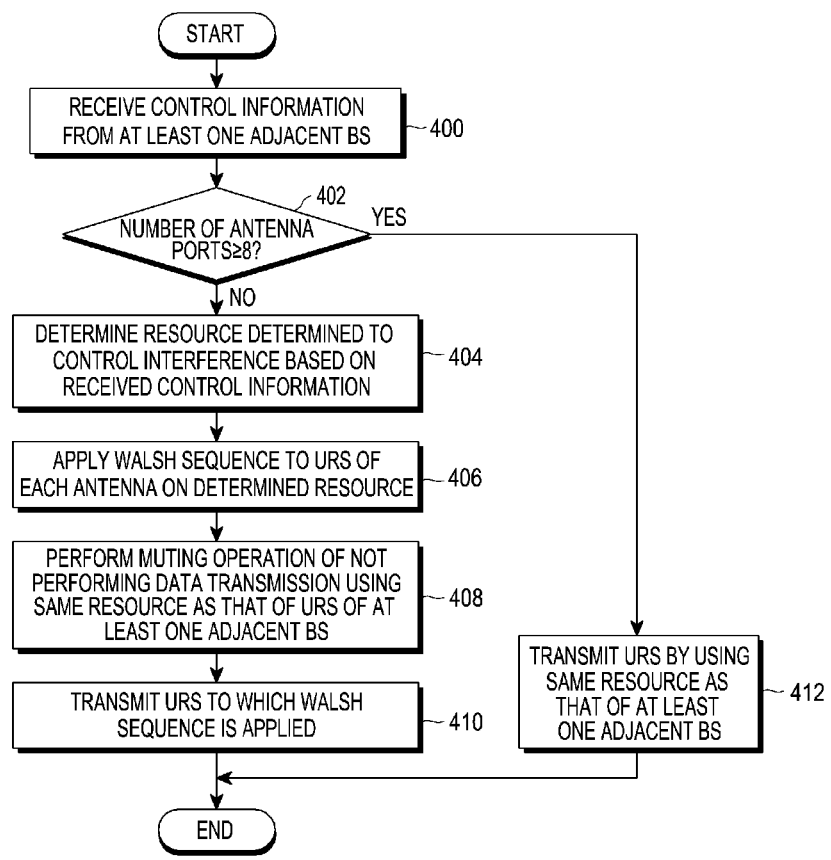
FIG. 4 is a flowchart illustrating a process in which a serving BS transmits a URS according to a second exemplary embodiment of the present invention.

FIG. 4 is a flowchart illustrating a process in which a serving BS transmits a URS according to a second exemplary embodiment of the present invention.

Referring to FIG. 4, in step 400, the serving BS receives control information from at least one adjacent BS. The control information may include scheduling information such as signal transmission information including URS transmission information of the at least one adjacent BS and resource allocation information.

Accordingly, the serving BS can identify a resource used to transmit the URS by the at least one adjacent BS based on the received control information. Further, based on the received control information, the serving BS can determine whether a resource used to transmit the URS by the at least one BS is the same as the resource used to transmit the URS by the serving BS. In another method, when the serving BS requests information indicating whether the resources are the same as the resources for the at least one adjacent BS, the information indicating whether the resources are the same may be included in the control information.

The control information may be received through various methods such as being received according to a request of the serving BS or periodically. Further, the control information may be transmitted to the serving cell UE periodically, at a particular time, or according to a request of the serving cell UE in order to be used to control interference of the at least one adjacent BS.

According to the second exemplary embodiment of the present invention, when the at least one adjacent cell is determined to cause (e.g., generate) interference, the process of transmitting the URS may be restrictively performed in consideration of the number of antenna ports. Accordingly, in step 402, the serving BS determines whether the number of antenna ports to be used is equal to or larger than a preset number N (e.g., FIG. 4 describes a case in which N is 8).

If the serving BS determines that the number of antenna ports is equal to or larger than 8 in step 402, then the serving BS proceeds to step 412 in which the serving BS transmits the URS and data by using the same resource as that of the at least one adjacent BS. In this case, the serving cell UE performs a channel estimation operation by using the interference removal method.

If the serving BS determines that the number of antenna ports is smaller than 8 in step 402, then the serving BS proceeds to step 404 in which the serving BS determines resources determined to control the interference based on the received control information. The resources determined to control the interference may correspond to the different resources determined to be used when the interference is generated in the respective BSs through a pre-negotiation between the serving BS and the at least one adjacent BS. Accordingly, when the resources determined to control the interference are used, the interference according to the URS transmission by the respective cells is not generated.

In step 406, the serving BS applies a Walsh sequence to the URS for each antenna on the determined resource (e.g., frequency band). As an example, when the serving BS uses four antennas, the Walsh sequence may correspond to Table 1.

TABLE 1

| Antenna port p | $[\overline{w}_p(0)\ \overline{w}_p(1)\ \overline{w}_p(2)\ \overline{w}_p(3)]$ |
|---|---|
| 7 | [+1 +1 −1 −1] |
| 8 | [−1 −1 +1 +1] |
| 9 | [+1 −1 −1 +1] |
| 10 | [−1 +1 +1 −1] |

After the Walsh sequence is applied to the URS in step 406, the serving BS proceeds to step 408 in which the serving BS performs a muting operation of not performing data transmission using the same resource as that of the URS of the at least one adjacent BS.

In step 410, the serving BS transmits the URS to which the Walsh sequence is applied to the serving cell UE by using the determined resource.

According to the second exemplary embodiment of the present invention, because the serving BS does not transmit data while the at least one adjacent BS transmits the URS as the muting operation is performed, interference due to data transmission of the serving BS is not generated in the at least one adjacent BS when the least one adjacent BS transmits the URS.

In order to increase effects according to the method of transmitting the URS provided by the first and second exemplary embodiments of the present invention, the muting operation may be additionally performed. The muting operation refers to an operation of ignoring a signal or data to be transmitted in a corresponding position and not transmitting the signal or data or an operation of setting transmission power in the corresponding position as 0 (zero power) and transmitting the signal or data.

According to an exemplary embodiment of the present invention, the muting operation is performed to allow the at least one adjacent BS not to transmit data while the serving BS transmits the URS or to transmit data of which transmission power is set as "0", and the muting operation is performed to allow the serving BS not to transmit data while the at least one adjacent BS transmits the URS or to transmit data of which transmission power is set as "0". Accordingly, when the muting operation is performed, an inter-cell interference problem according to the URS transmission is not generated.

When the muting operation is performed, the number of REs used to transmit the data may be reduced (e.g., the number of REs used to transmit the URS of the adjacent cell is reduced) and a code rate may increase. In order to solve the problem, a power compensation method may be used according to an exemplary embodiment of the present invention. The power compensation method includes a method which can compensate for a signal reception capability of the UE by allocating power allocated to the RE which cannot be used to transmit the data to the remaining REs used to transmit the data according to URS transmission of the adjacent cell.

Hereinafter, an operation of the serving BS according to exemplary embodiments of the present invention will be described with reference to FIGS. 5 and 6.

Figure 5:
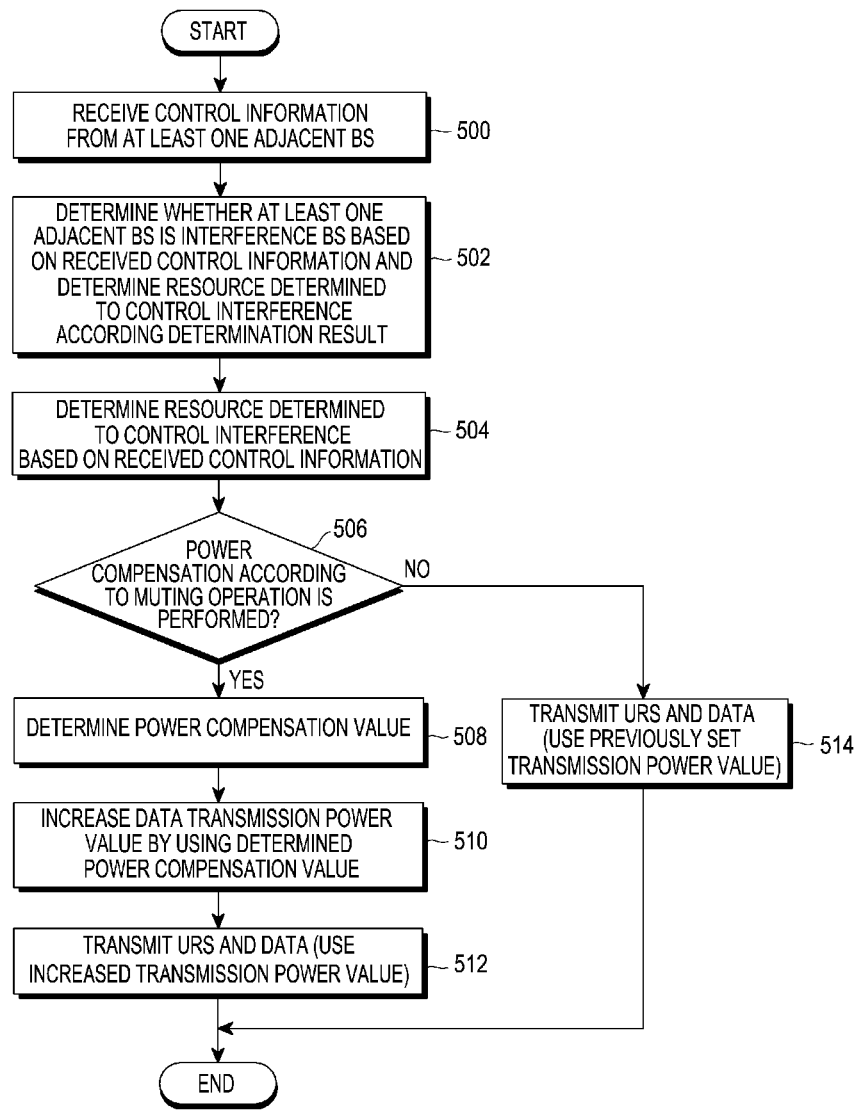
FIG. 5 is a flowchart illustrating a process in which a serving BS transmits a URS according to a third exemplary embodiment of the present invention.

FIG. 5 is a flowchart illustrating a process in which a serving BS transmits a URS according to a third exemplary embodiment of the present invention.

Referring to FIG. 5, in step 500, the serving BS receives control information from the at least one adjacent BS. The control information may include scheduling information such as signal transmission information including URS transmission information of the at least one adjacent BS and resource allocation information.

Accordingly, the serving BS can identify a resource used to transmit the URS by the at least one adjacent BS based on the received control information. Further, based on the received control information, the serving BS can determine whether a resource used to transmit the URS by the at least one BS is the same as the resource used to transmit the URS by the serving BS. In another method, when the serving BS requests information indicating whether the resources are the same as the resources for the at least one adjacent BS, the information indicating whether the resources are the same may be included in the control information.

The control information may be received through various methods such as being received according to a request of the serving BS or periodically. Further, the control information may be transmitted to the serving cell UE periodically, at a particular time, or according to a request of the serving cell UE in order to be used to control interference of the at least one adjacent BS.

In step 502, when the at least one adjacent cell is determined to cause (e.g., generate) interference, the serving BS determines resources determined to control the interference based on the received control information. The resources determined to control the interference may correspond to the different resources determined to be used when the interference is generated in the respective BSs through a pre-negotiation between the serving BS and the at least one adjacent BS. Accordingly, when the resources determined to control the interference are used, the interference according to the URS transmission by the respective cells is not generated.

In step 504, the serving BS performs the muting operation of not performing data transmission using the same resource as that of the URS of the at least one adjacent BS. When the muting operation is performed, because the serving BS does not transmit data while the at least one adjacent BS transmits the URS as the muting operation is performed, interference due to data transmission of the serving BS is not generated in the at least one adjacent BS when the at least one adjacent BS transmits the URS.

In step 506, the serving BS determines whether to compensate for power according to the muting operation. If the serving BS determines not to compensate for power according to the muting operation in step 506, then the serving BS proceeds to step 514 in which the serving BS transmits the URS and data to the UE by using a preset transmission power value.

In contrast, if the serving BS determines to compensate for power according to the muting operation in step 506, then the serving BS proceeds to step 508 in which the serving BS determines a power compensation value. For example, when the at least one adjacent BS uses a first resource to transmit the URS, the serving BS determines a power compensation value such that determined power to transmit the data by using the first resource is additionally used when the remaining resources except for the first resource are used among resources for data transmission. At this time, the power compensation value may be used as a boosting value for increasing a power value (even though the power value is not increased, it can be considered that the power value is boosted one time, so the power compensation value indicates a value for controlling power values of all received signals) and determined in consideration of a capability of the serving cell UE and a channel state.

After the power compensation value is determined in step 508, the serving BS proceeds to step 510 in which the serving BS increases a power value for transmitting data by using the determined power compensation value.

In step 512, the serving BS transmits the URS and data to the serving cell UE. The data is transmitted using the increased power value.

When the power compensation value is determined, the serving BS allows the serving cell UE to improve a signal reception capability based on the power compensation value by transmitting in advance information on the determined power compensation value to the serving cell UE.

Figure 6:
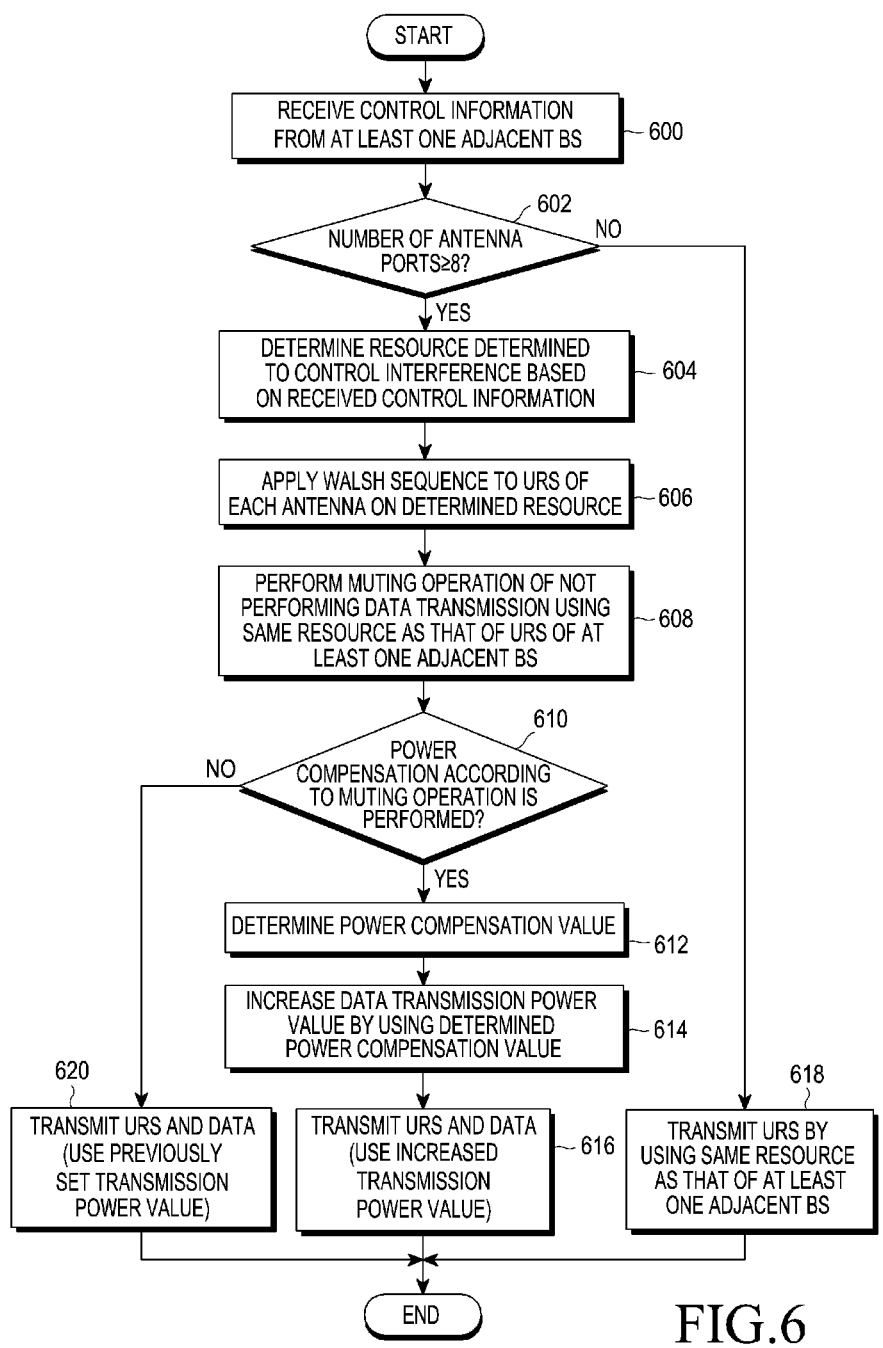
FIG. 6 is a flowchart illustrating a process in which a serving BS transmits a URS according to a fourth exemplary embodiment of the present invention.

FIG. 6 is a flowchart illustrating a process in which a serving BS transmits a URS according to a fourth exemplary embodiment of the present invention.

Referring to FIG. 6, in step 600, the serving BS receives control information from at least one adjacent BS. The control information may include scheduling information such as signal transmission information including URS transmission information of the at least one adjacent BS and resource allocation information.

Accordingly, the serving BS can identify a resource used to transmit the URS by the at least one adjacent BS based on the received control information. Further, based on the received control information, the serving BS can determine whether a resource used to transmit the URS by the at least one BS is the same as the resource used to transmit the URS by the serving BS. In another method, when the serving BS requests information indicating whether the resources are the same as the resources for the at least one adjacent BS, the information indicating whether the resources are the same may be included in the control information.

The control information may be received through various methods such as being received according to a request of the serving BS or periodically. Further, the control information may be transmitted to the serving cell UE periodically, at a particular time, or according to a request of the serving cell UE in order to be used to control interference of the at least one adjacent BS.

In step 602, when the at least one adjacent cell is determined to cause (e.g., generate) interference, the serving BS determines whether the number of antenna ports to be used is equal to or larger than a preset number of N. As an example, FIG. 6 describes a case in which N is 8.

If the serving BS determines that the number of antenna ports is equal to or larger than 8 in step 602, then the serving BS proceeds to step 618 in which the serving BS transmits the URS and data by using the same resource as that of the at least one adjacent BS. In this case, the serving cell UE performs a channel estimation operation by using an interference removal method.

If the serving BS determines that the number of antenna ports is smaller than 8 in step 602, then the serving BS proceeds to step 604 in which the serving BS determines resources determined to control the interference based on the received control information. The resources determined to control the interference may correspond to the different resources determined to be used when the interference is generated in the respective BSs through a pre-negotiation between the serving BS and the at least one adjacent BS. Accordingly, when the resources determined to control the interference are used, the interference according to the URS transmission by the respective cells is not generated.

In step 606, the serving BS applies a Walsh sequence to the URS for each antenna on the determined resource (e.g., frequency band). The number of Walsh sequences is the same as the number of antennas, and each of a plurality of Walsh sequences may be configured in an orthogonal form.

In step 608, the serving BS performs a muting operation of not performing data transmission using the same resource as the resources of the URS of the at least one adjacent BS. When the muting operation is performed, because the serving BS does not transmit data while the at least one adjacent BS transmits the URS as the muting operation is performed, interference due to data transmission of the serving BS is not generated in the at least one adjacent BS when the least one adjacent BS transmits the URS.

In step 610, the serving BS determines whether to compensate for power according to the muting operation.

If the serving BS determines not to compensate for power according to the muting operation in step 610, then the serving BS proceeds to step 620 in which the serving BS transmits the URS and data to the UE by using a preset transmission power value.

In contrast, if the serving BS determines to compensate for power according to the muting operation in step 610, then the serving BS proceeds to step 612 in which the serving BS determines a power compensation value. For example, when the at least one adjacent BS uses a first resource to transmit the URS, the serving BS determines a power compensation value such that determined power to transmit the data by using the first resource is additionally used when the remaining resources except for the first resource are used among resources for data transmission. At this time, the power compensation value may be used as a boosting value for increasing a power value (e.g., even though the power value is not increased, the power value may be considered to be boosted one time, so the power compensation value indicates a value for controlling power values of all received signals) and determined in consideration of a capability of the serving cell UE and a channel state.

After the power compensation value is determined in step 612, the serving BS proceeds to step 614 in which the serving BS increases a power value for transmitting data by using the determined power compensation value.

Thereafter, in step 616, the serving BS transmits the URS and data to the serving cell UE. The data is transmitted using the increased power value.

Meanwhile, when the power compensation value is determined, the serving BS allows the serving cell UE to improve a signal reception capability based on the power compensation value by transmitting in advance information on the determined power compensation value to the serving cell UE.

Figure 7:
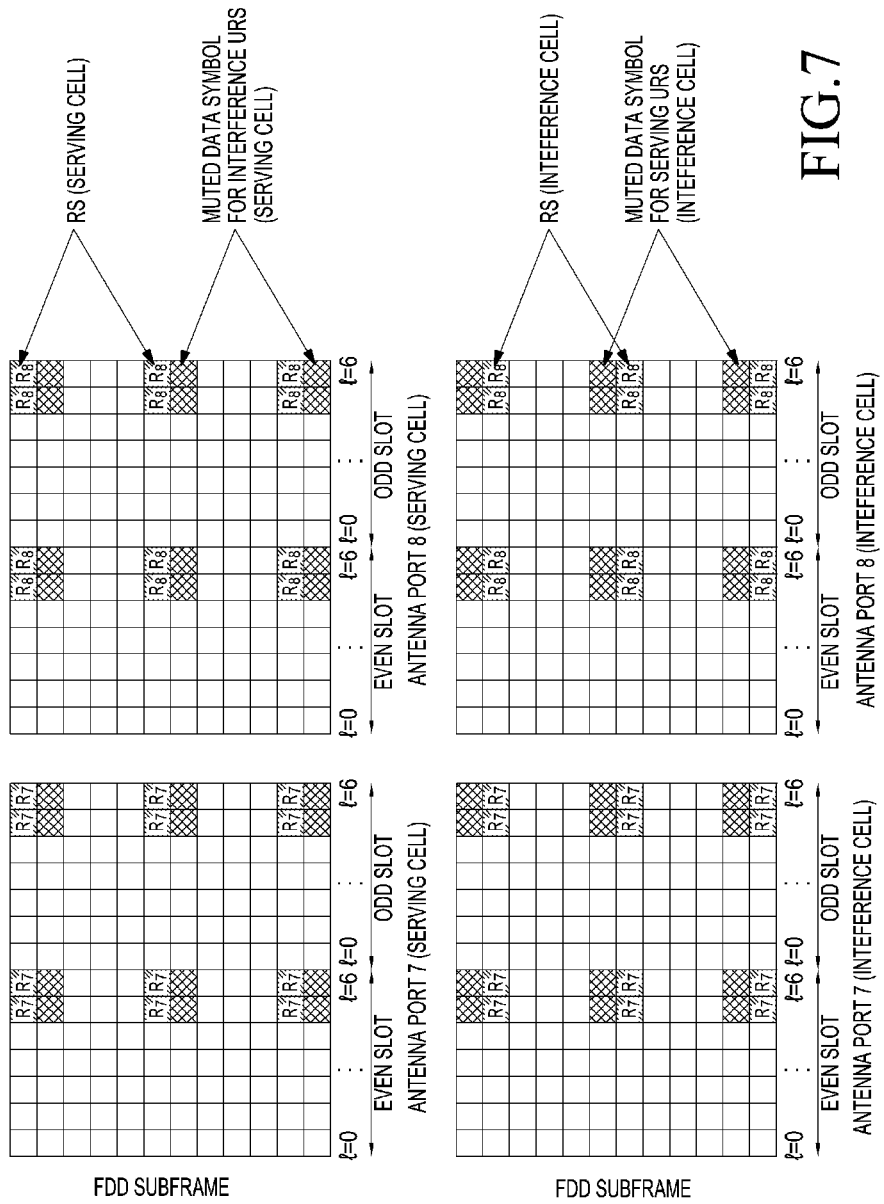
FIG. 7 is a diagram illustrating an example of RB mapping of a URS transmitted using two antenna ports according to an exemplary embodiment of the present invention.
Figure 8A:
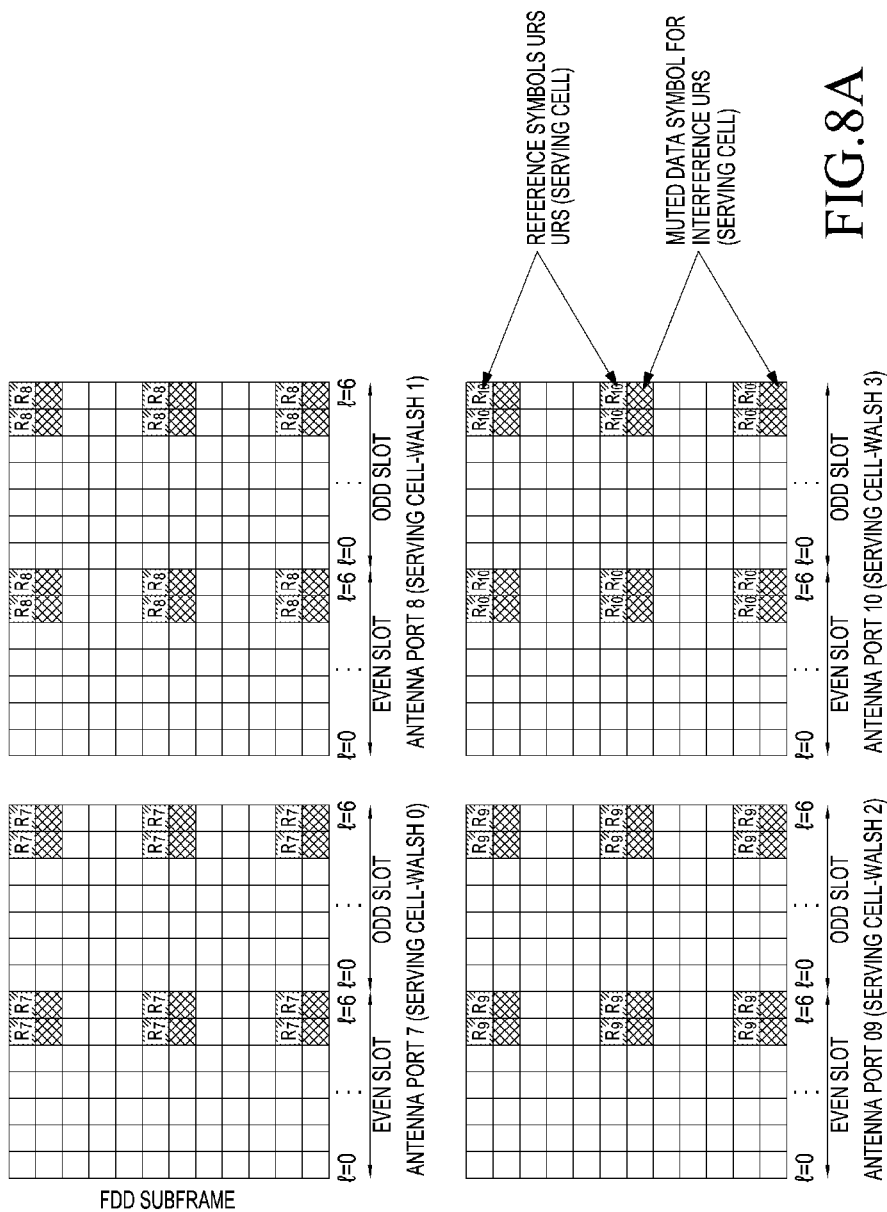
FIGS. 8A and 8B are diagrams illustrating examples of RB mapping of a URS transmitted using four antenna ports according to an exemplary embodiment of the present invention.
Figure 8B:
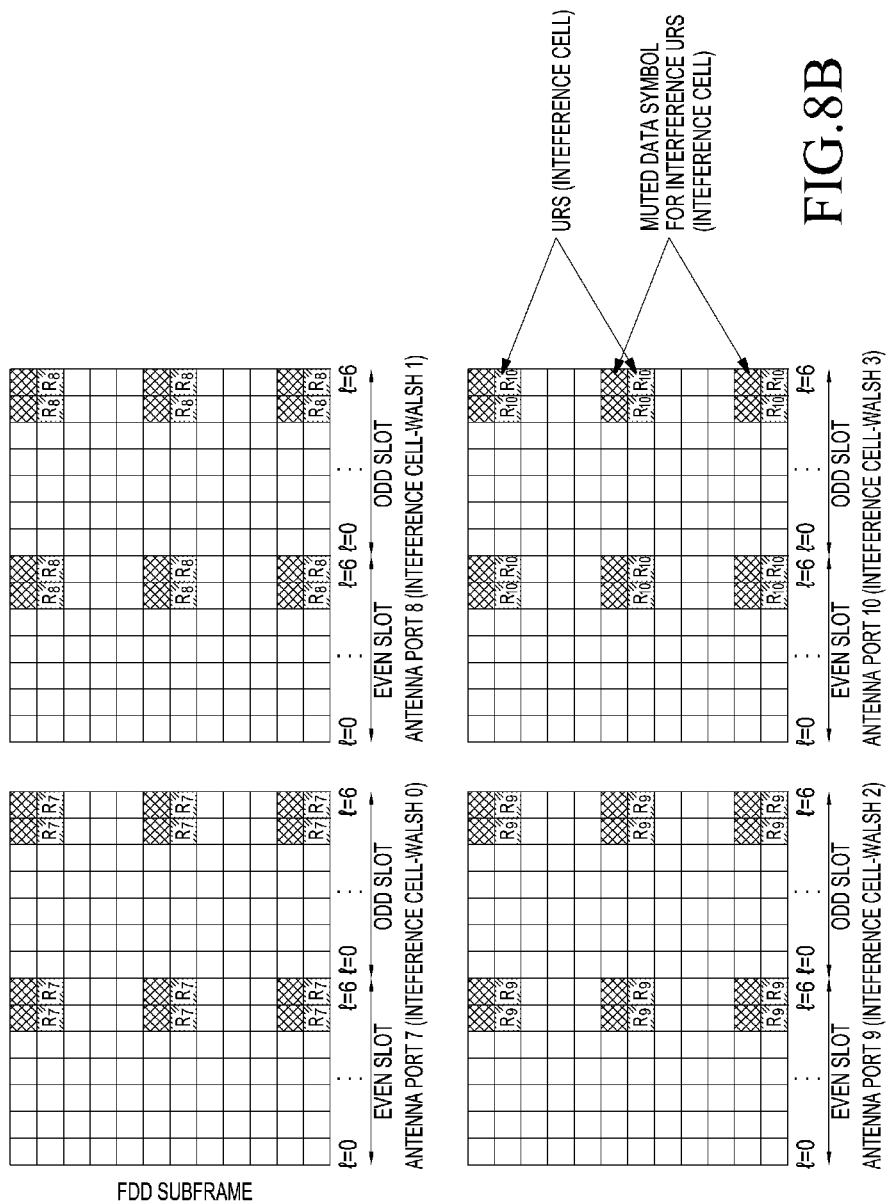

FIG. 7 is a diagram illustrating an example of RB mapping of a URS transmitted using two antenna ports according to an exemplary embodiment of the present invention. FIGS. 8A and 8B illustrate examples of RB mapping of a URS transmitted using four antenna ports according to an exemplary embodiment of the present invention.

Referring to FIG. 7, an example of RB mapping of the URS in a case in which each of the serving cell and the interference cell (adjacent cell of the serving cell) uses antenna port 7 and antenna port 8 is illustrated.

Referring to FIGS. 8A and 8B, examples of RB mapping of the URS in a case in which each of the serving cell and the interference cell uses antenna ports 7 to 10 are illustrated.

Exemplary embodiments of the present invention related to URS transmission will be described below with reference to FIGS. 7, 8A, and 8B.

As illustrated in FIGS. 7, 8A, and 8B, the URS of the serving cell and the URS of the interference cell may be transmitted using different REs. According to the first to fourth exemplary embodiments of the present invention, the serving cell and the interference cell transmit the URSs by using different REs based on control information of each cell, so that a channel estimation capability of the UE within the corresponding cell can be improved (e.g., the URS is transmitted according to an FDM scheme).

Further, according to the second and fourth exemplary embodiments of the present invention, in consideration of a case in which the URS is generally allocated to the same RE in a plurality of antenna ports, the URSs of respective antenna ports are distinguishably transmitted by applying the Walsh sequence to the URS allocated to each antenna port as described above (e.g., the URS is transmitted according to a CDM scheme).

As illustrated in FIG. 7, "$R_7$" and "$R_8$" (allocated to antenna ports 7 and 8 of each serving cell, respectively) using the same RE can be distinguishably transmitted as orthogonal Walsh sequences are applied. Similarly, as illustrated in FIG. 8A, "$R_7$" to "$R_{10}$" (allocated to antenna ports 7 to 10 of the serving cell, respectively) using the same RE can be distinguishably transmitted as orthogonal Walsh sequences are applied.

According to the second to fourth exemplary embodiments of the present invention, in order to solve the problem generated as the URS of the serving cell and the data of the interference cell (or the URS of the interference cell and the data of the serving cell) are transmitted using the same RE, the interference problem is prevented according to the muting method.

For example, according to the second to fourth exemplary embodiments of the present invention, as illustrated in FIGS. 7, 8A, and 8B, the interference cell may not transmit data by using the corresponding resource when the serving cell transmits the URS, and the serving cell may not transmit data by using the corresponding resource when the interference cell transmits the URS.

Further, according to the third and fourth exemplary embodiments of the present invention, a signal reception capability of the UE is guaranteed by allocating power allocated to a RE which cannot be used to transmit data to the remaining REs used to transmit data according to the muting operation.

Operations of the UE according to an exemplary embodiment of the present invention will be described with reference to FIG. 9.

When the serving BS transmits the URS by using the URS transmission method according to the first exemplary embodiment of the present invention, the UE receives the URS transmitted using a different resource from the resource of the at least one adjacent BS and performs a channel estimation operation.

When the serving BS transmits the URS by using the URS transmission method according to the second exemplary embodiment of the present invention, the UE determines whether the number of transmission antenna ports is smaller than the preset number and thereafter performs a channel estimation operation of the UE corresponding to the URS transmission method to which a Walsh sequence is applied according to a result of the determination.

Figure 9:
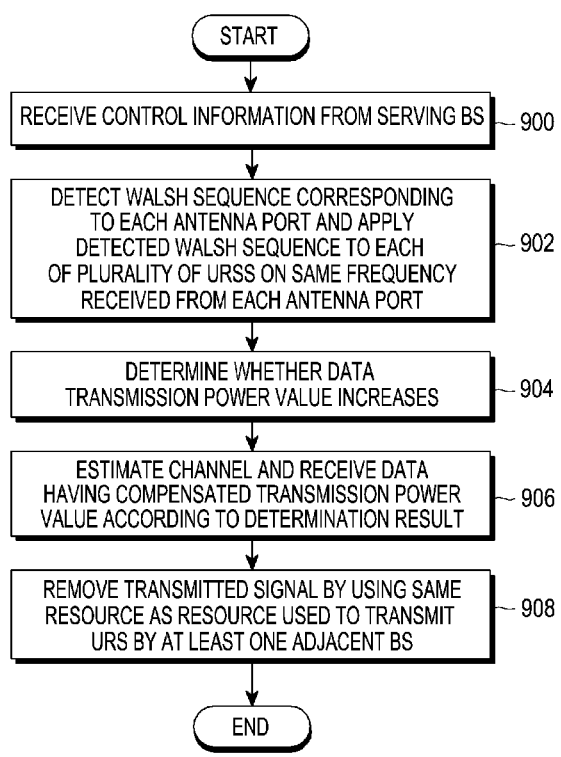
FIG. 9 is a flowchart illustrating a process in which a User Equipment (UE) receives a URS according to an exemplary embodiment of the present invention.

When the serving BS transmits the URS by using the URS transmission methods according to the third and fourth exemplary embodiments of the present invention, the UE performs the processes illustrated in FIG. 9.

FIG. 9 is a flowchart illustrating a process in which the UE receives the URS according to an exemplary embodiment of the present invention.

Referring to FIG. 9, in step 900, the UE receives interference control information from the serving BS. The interference control information may include signal transmission information on each of the serving BS and the at least one adjacent BS. In addition, as an example, the interference control information may include URS transmission information on each of the serving BS and the at least one adjacent BS and resource allocation information.

In step 902, the UE detects a Walsh sequence corresponding to each antenna port of the serving BS based on the received interference control information and applies the detected Walsh sequence to four URSs on the same resource (frequency) received from each antenna port. The Walsh sequence may be used through an arrangement between the serving BS and the UE or used by the UE to receive information on the Walsh sequence from the serving BS to detect the Walsh sequence.

In step 904, the UE determines whether a data transmission power value increases. The UE estimates the data transmission power value and compares the estimated data transmission power value with a preset data transmission power value so as to determine whether the data transmission power value increases. In another example, the UE can determine whether the data transmission power value increases based on information on a power compensation value received from the serving BS. In this case, the information on the power compensation value may be received periodically, during a preset time section, or according to a request of the UE.

In step 906, the UE estimates a channel and receives data having the compensated transmission power value according to a result of the determination. For example, when the data transmission power value is determined to increase, the UE can receive data through a sub-carrier having the compensated power.

In step 908, the UE erases a signal transmitted using the same resource as a resource (hereinafter, referred to as a "second resource") used to transmit the URS by the at least one adjacent BS (e.g., processes a received signal value as "0"). The UE determines that the serving cell does not transmit the data by using the second resource. Accordingly, when a signal is transmitted using the second resource, the UE performs the above operation in order to ignore the corresponding signal.

Because the UE performs a decoding operation for the data received from the at least one BS as well as the data received from the serving BS, when the signal using the second resource is received from the at least one BS, eraser processing is performed for the corresponding signal.

Operations of the BS and the UE according to an exemplary embodiment of the present invention will be described with reference to FIGS. 10 and 11.

Figure 10:
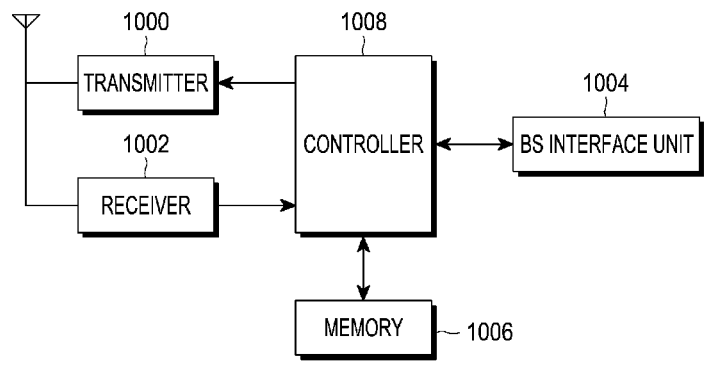
FIG. 10 is a block diagram illustrating a BS according to an exemplary embodiment of the present invention.

FIG. 10 is a block diagram of a BS according to an exemplary embodiment of the present invention.

Referring to FIG. 10, the serving BS includes a transmitter 1000, a receiver 1002, a BS interface unit 1004, a memory 1006, and a controller 1008.

The transmitter 1000 and the receiver 1002 are components used to perform communication with the serving cell UE. For example, the transmitter 1000 transmits a signal such as the URS and data to the serving cell UE, and the receiver 1002 receives a signal and data from the serving cell UE. Although not illustrated in FIG. 10, the transmitter 1000 may include an encoder for encoding a transmitted signal and a modulator for modulating the transmitted signal.

The BS interface unit 1004 performs communication with the at least one adjacent BS. Specifically, the BS interface unit 1004 exchanges control information with the adjacent BS. The exchanging of the control information may be performed periodically or at a particular time.

The memory 1006 stores all information and data generated in operation processes of the serving BS and the control information received from the at least one adjacent BS.

The controller 1008 determines the operations of the serving BS by controlling the transmitter 1000, the receiver 1002, the BS interface unit 1004, and the memory 1006. For example, the controller 1008 can control the components to perform the URS transmitting methods according to the first to fourth exemplary embodiments of the present invention as illustrated in FIGS. 3 to 6.

Figure 11:
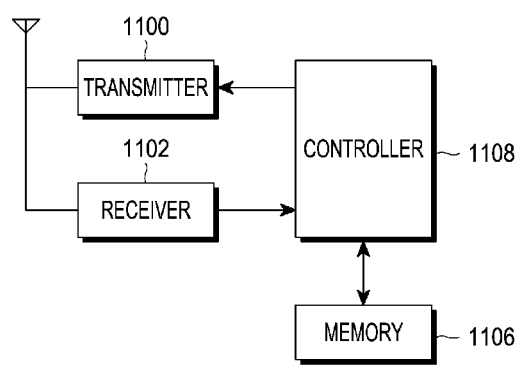
FIG. 11 is a block diagram illustrating a UE according to an exemplary embodiment of the present invention.

FIG. 11 is a block diagram of a UE according to an exemplary embodiment of the present invention.

Referring to FIG. 11, the UE includes a transmitter 1100, a receiver 1102, a memory 1106, and a controller 1108.

The transmitter 1100 and the receiver 1102 are components for wireless communication of the UE. The transmitter 1100 transmits a signal, data, and the like to the serving BS, and the receiver 1102 receives a signal such as the URS, data, and the like from the serving BS and receives a signal of the adjacent BS as an interference signal. Further, although not illustrated in FIG. 11, the receiver 1102 may include a demodulator for demodulating a received signal and a decoder for decoding the received signal.

The memory 1106 stores all information and data generated during operation processes of the UE.

The controller 1108 determines the operations of the UE by controlling the transmitter 1100, the receiver 1102, and the memory 1106. For example, the controller 1108 controls the components to perform the URS transmitting method according to an exemplary embodiment of the present invention as illustrated in FIG. 9. Although not illustrated in FIG. 11, the controller 1108 may include a channel estimator.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a signal by a first base station (BS) in a wireless communication system, the method comprising:
   receiving, from a second BS being adjacent to the first BS, information on a second resource on which the second BS transmits a second reference signal (RS);
   determining a first resource for a first RS of the first BS based on the information, wherein the first resource is different from the second resource; and
   transmitting the first RS on the determined first resource, wherein a data transmission of the first BS on the second resource is prevented.

2. The method of claim 1, wherein the transmitting of the first RS comprises controlling interference based on the first resource.

3. The method of claim 1, further comprising:
   transmitting control information on the first resource and the second resource to a user equipment (UE).

4. The method of claim 1, further comprising:
   determining a power compensation value according to the prevention of the data transmission on the second resource;
   determining boosted transmission power based on the power compensation value; and
   applying the boosted transmission power to data to be transmitted on remaining resources except for the first resource during the prevention of the data transmission.

5. The method of claim 4, further comprising:
   transmitting control information on the power compensation value to a user equipment (UE).

6. The method of claim 1, wherein the transmitting of the first RS comprises:
   if the first BS uses a plurality of antenna ports to transmit the first RS, applying sequences which are orthogonal to each other to the plurality of antenna ports, respectively; and
   transmitting the first RS through the plurality of antenna ports by using the sequences.

7. A non-transitory computer-readable storage medium storing instructions, that when executed, cause a processor to perform the method of claim 1.

8. A method for receiving a signal by a user equipment (UE) in a wireless communication system, the method comprising:
   receiving control information including information on a first resource and a second resource, wherein a first reference signal (RS) of a first base station (BS) is transmitted on the first resource and a second RS of a second BS being adjacent to the first BS is transmitted on the second resource; and
   receiving the first RS on the first resource from the first BS based on the control information,
   wherein the information on the second resource is transmitted from the second BS to the first BS, and a data transmission of the first BS on the second resource is prevented.

9. The method of claim 8, further comprising:
if control information on a power compensation value is received from the first BS, receiving a data signal transmitted with transmission power being boosted based on the power compensation value; and
performing a power compensation on the received data signal based on the power compensation value.

10. The method of claim 8, wherein the receiving the first RS comprises:
detecting sequences corresponding to a plurality of antenna ports of the first BS, respectively, based on the control information; and
applying the detected sequences to RSs received from the plurality of antenna ports,
wherein the sequences corresponding to the plurality of antenna ports are orthogonal to each other.

11. A non-transitory computer-readable storage medium storing instructions, that when executed, cause a processor to perform the method of claim 8.

12. An apparatus in a first base station (BS) in a wireless communication system, the first BS comprising:
a receiver configured to receive, from a second BS being adjacent to the first BS, information on a second resource on which the second BS transmits a second reference signal (RS);
a controller configured to determine a first resource for a first RS of the first BS based on the information, wherein the first resource is different from the second resource; and
a transmitter configured to transmit the first RS on the determined first resource,
wherein a data transmission of the first BS on the second resource is prevented.

13. The apparatus of claim 12,
wherein the controller is further configured to control interference based on the first resource.

14. The apparatus of claim 12, wherein the transmitter transmits control information on the first resource and the second resource to a user equipment (UE).

15. The apparatus of claim 12, wherein the controller is further configured to:
determine a power compensation value according to the prevention of the data transmission on the second resource,
determine boosted transmission power based on the power compensation value, and
apply the boosted transmission power to data to be transmitted on remaining resources except for the first resource during the prevention of the data transmission.

16. The apparatus of claim 15, wherein the transmitter is further configured to transmit control information on the power compensation value to a user equipment (UE).

17. The apparatus of claim 12, wherein the controller is further configured to:
if the first BS uses a plurality of antenna ports, apply sequences which are orthogonal to each other to the plurality of antenna ports, respectively, and
control the transmitter to transmit the first RS through the plurality of antenna ports by using the sequences.

18. An apparatus in a user equipment (UE) in a wireless communication system, the UE comprising:
a receiver configured to:
receive control information including information on a first resource and a second resource, wherein a first reference signal (RS) of a first base station (BS) is transmitted on the first resource and a second RS of a second BS being adjacent to the first BS is transmitted on the second resource,; and
receive the first RS on the first resource from the first BS based on the control information,
wherein information on the second resource is transmitted from the second BS to the first BS, and a data transmission of the first BS on the second resource is prevented.

19. The apparatus of claim 18,
wherein if control information on a power compensation value is received from the first BS, the receiver is further configured to receive a data signal transmitted with transmission power being boosted based on the received power compensation value, and the controller further configured to perform a power compensation on the received data signal based on the power compensation value.

20. The apparatus of claim 18, wherein the receiver is further configured to:
detect sequences corresponding to a plurality of antenna ports of the first BS, respectively based on the control information, and
apply the detected sequences to RSs received from the plurality of antenna ports,
wherein the sequences corresponding to the plurality of antenna ports are orthogonal to each other.

* * * * *